Patented Sept. 5, 1950

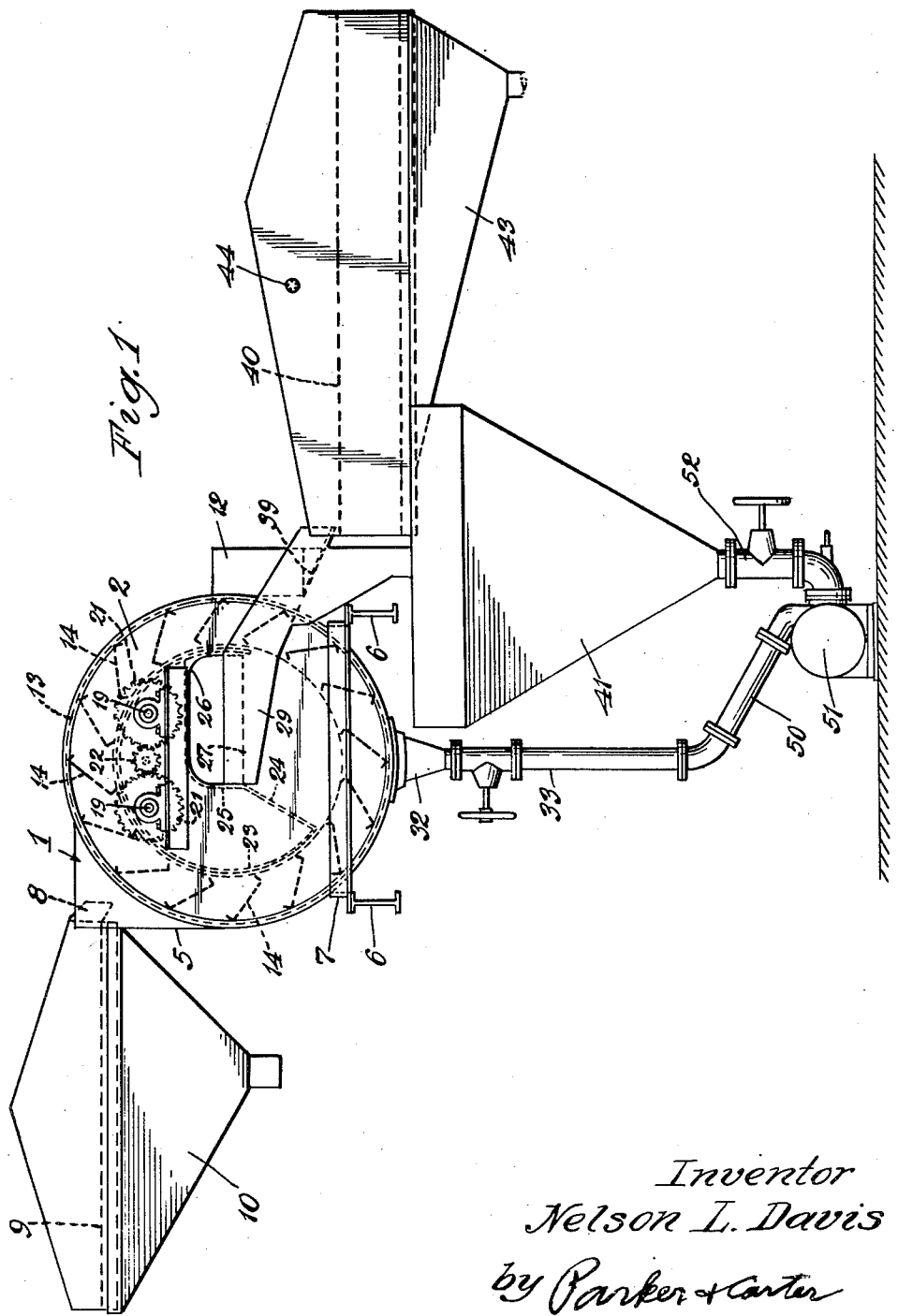

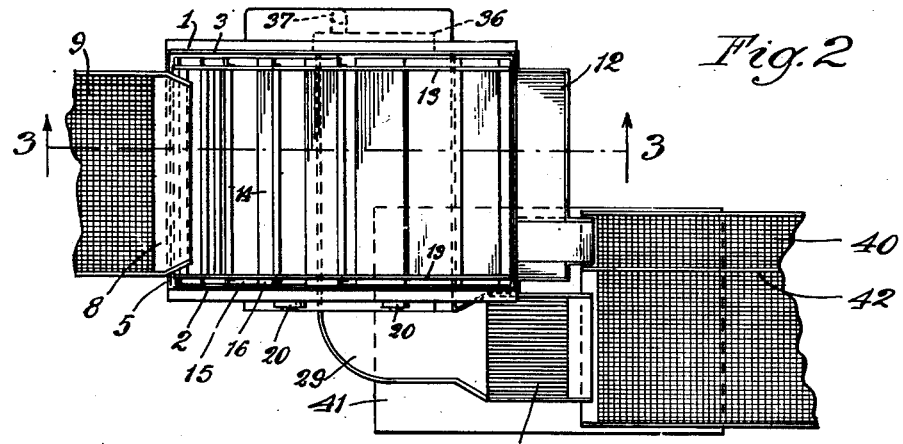
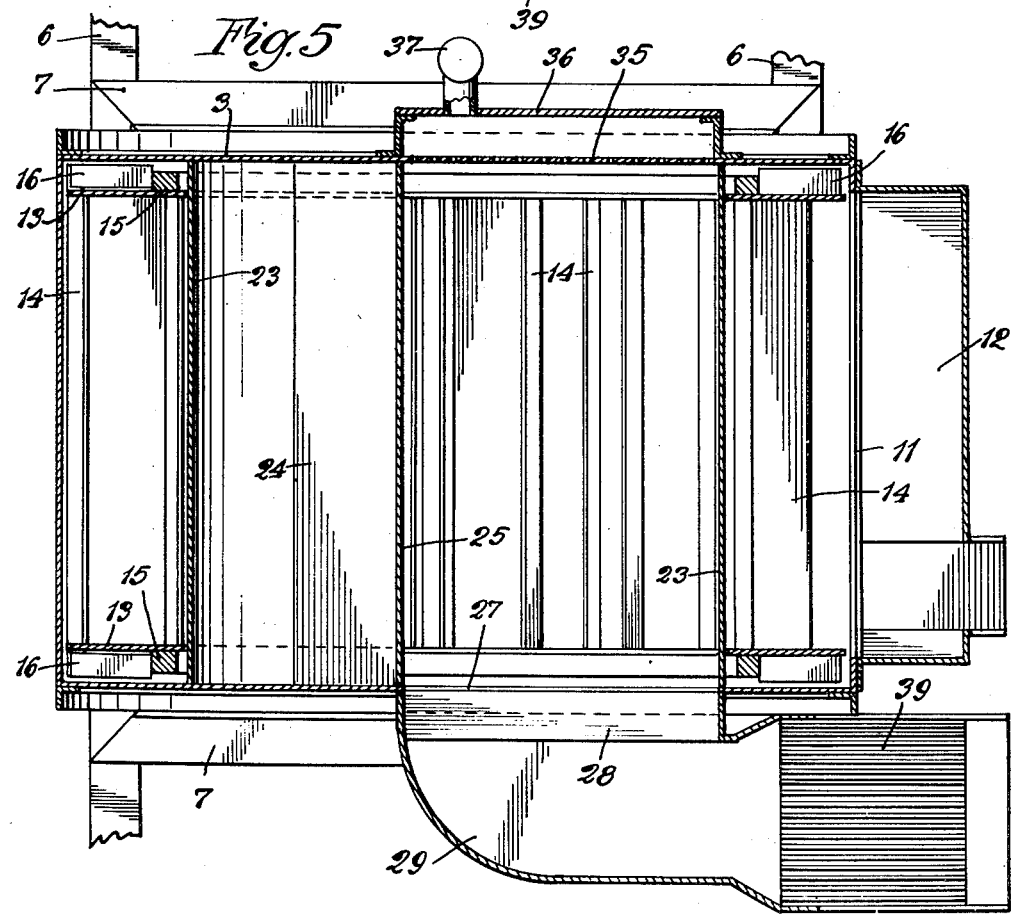

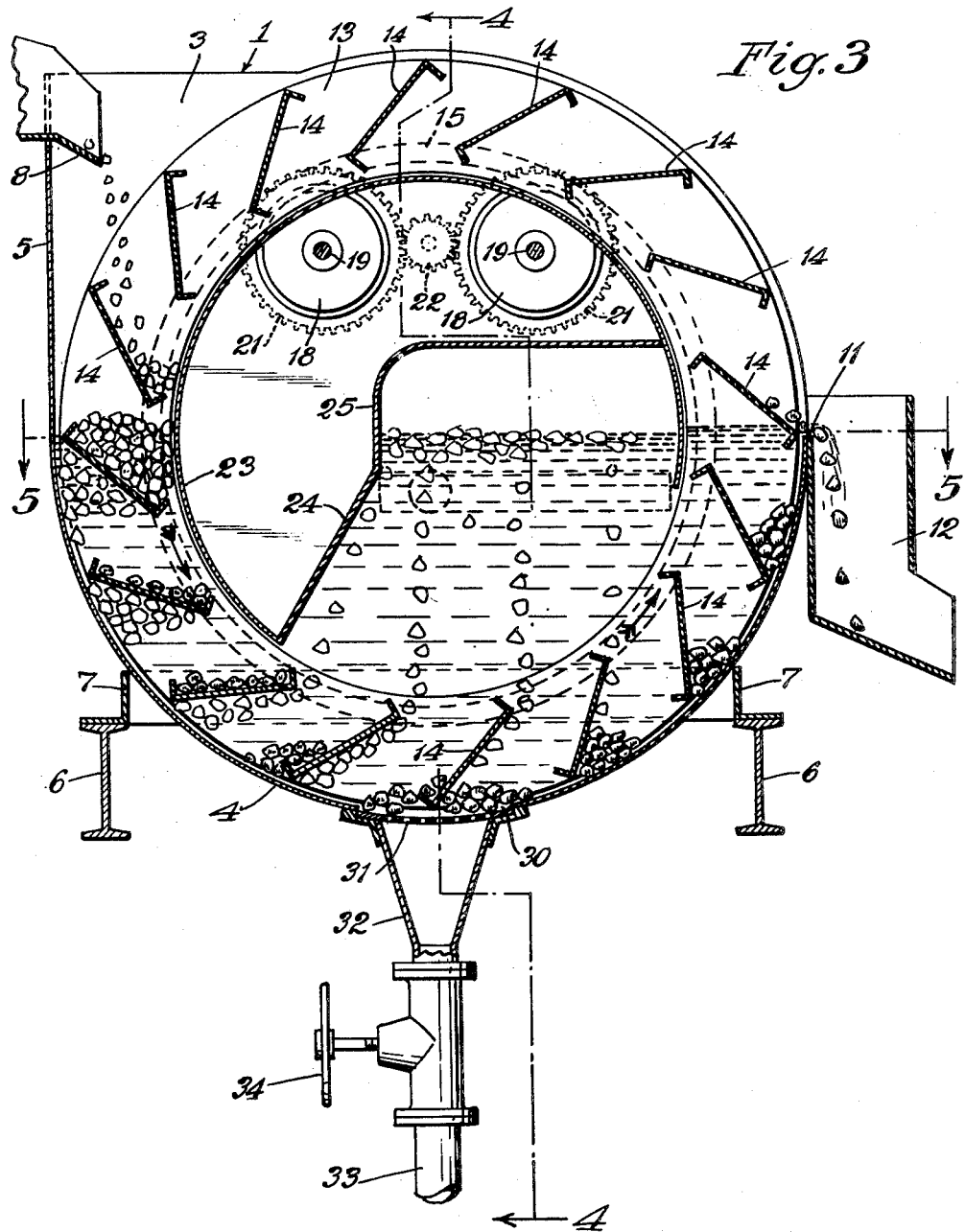

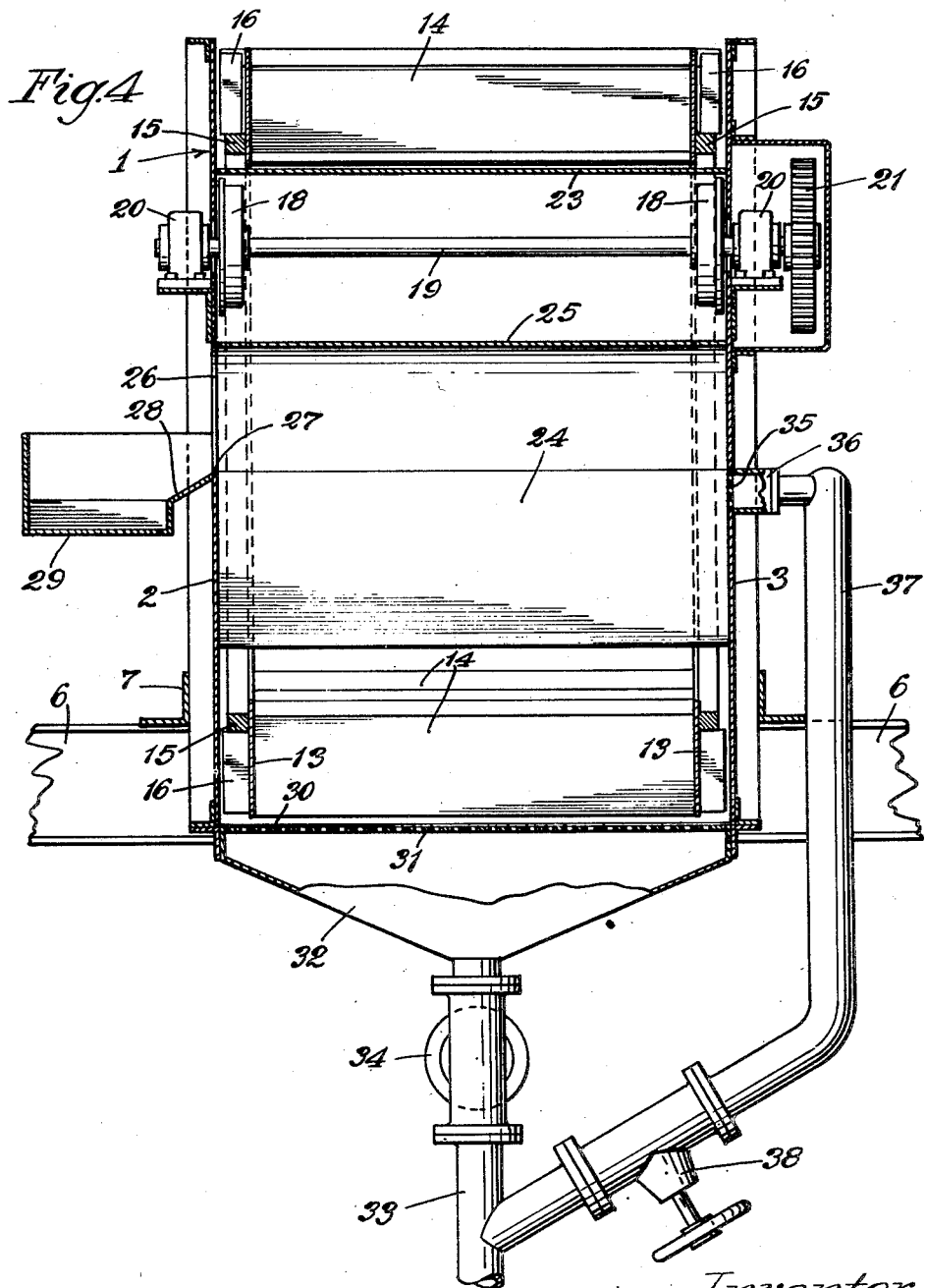

2,521,152

UNITED STATES PATENT OFFICE 2,521,152

MINERAL SEPARATION PROCESS

Nelson L. Davis, Chicago, Ill.

Application July 17, 1947, Serial No. 762,720

4 Claims. (Cl. 209—173)

My invention relates to improvements in mineral separation apparatus and process and has for one object to provide an apparatus and process which can be used for the float and sink separation of such minerals as coal and the like from refuse having a different specific gravity.

Another object of the invention is to provide a process and apparatus which can be used for the gravity separation of such minerals independent of and without regard to the size of the particles.

Another object of the invention is to provide such a separating apparatus and process as can be used with a very small proportion of flotation liquid with reference to the weight and volume of the solids being treated.

Other objects will appear from time to time in the specification and claims.

Many method and apparatus inventions have been made, developed and used which permit float and sink separations. These are classified as follows:

(a) Those which use heavy liquids such as salt brines or chlorinated hydrocarbons.

(b) Those which use liquid suspensions of non-magnetic solids in water.

(c) Those which use liquid suspensions of magnetic solids in water.

With methods (b) and (c) the accuracy of the float and sink separation obtainable with heavy liquids is closely approached by selecting solids having a narrow range of particle size and for which reasonably uniform settling velocities can be established. Where the liquid containing such solids is given a rising velocity greater than the settling velocity of the solids, each particle will have the property of supporting a superimposed load. Where the number of such solids is increased per unit of volume of the supporting liquid, heavier superimposed loads can be supported and by this means it has been found possible to predetermine the density of such suspensions proper to correctly produce a float and sink separation at the desired level of specific gravity. The liquid suspension of solids is known as "heavy media" and will hereafter be referred to as such.

In practice two primary difficulties have been encountered with heavy media processes. The first is the disposal, or evacuation, of large size sink material from the separatory vessel. Since a true float and sink separation is freed from any limitation of the top size for feed material, maximum benefits from heavy media can be realized when large-sized reject material can be evacuated simply and at minimum cost. The second difficulty has been found to exist in the evacuation of sink material having low settling velocity. Obviously the problem becomes serious when the evacuation of such "teeter" material can only occur at rates less than rates at which it accumulates in the vessel out of the feed material. When that is the case, the vessel becomes congested, the feed must be stopped, and the vessel artificially purged before the normal operation of the process can be resumed.

An earlier invention of mine has solved both of these difficulties, the first by providing an elevator wheel with portioned compartments operating within the vessel in such a manner that large size sink material can be lifted out of the bath. The wheel is circumferentially covered with a perforated plate drum through which liquid medium is free to flow, thus permitting an updraft necessary to support the suspended solids in the liquid medium contained by the vessel; and at the same time permit a downdraft which is used to supplement gravity in causing "teeter" material to sink at a faster rate. Such "teeter" is thereby strained from the liquid medium of the downdraft and evacuated from the vessel by the elevator wheel along with the rest of the sink material of high settling velocity, thus solving the second difficulty referred to.

In every method or apparatus employing the float and sink process, two basic methods of operation are possible. With one, the feed material is introduced to the bath at its surface whereupon the float material is supported and through which the sink material must descend. With the other, the feed material may be forced to the lower part of the bath through a restricted channel, the buoyant, having reached the lower part of the bath and been forced beyond the lower extremity of the channel, is free to rise to the surface, leaving the sink material at the bottom. It is this latter method and the apparatus used that forms the subject matter of my invention.

My invention avoids the necessity of having both updraft and downdraft currents in the same tub. I propose to provide a method and apparatus where, instead of bringing the teeter down by a downdraft current to speed up the settlement of the teeter, I will positively submerge the light, the heavy and the intermediate or teeter material, carrying them all together down to the bottom of the tank, or at least to the bottom of the treatment zone, and then releasing them to permit the light material to float freely to the top while the heavy material remains at the bottom until it is positively withdrawn.

As the material is moved downwardly toward the bottom of the tub and as it enters the bath and proceeds downwardly therethrough, there is an initial gravity separation of float and sink material. The sink material passes down under the influence of gravity while the float material, tending to be supported by the heavy medium, tends to remain at the surface of the bath until it is positively submerged and forced to follow down behind the sink material. As the sink and float material passes downwardly toward the level at which the float is released and the sink is propelled upwardly, the initially separated masses of float and sink material are stirred to permit release of entrapped material.

The flotation medium, whatever it may be, will normally be re-used and must be effectively separated both from the recovered material and from the refuse so that a minimum amount of makeup may be needed, waste of the flotation material be reduced to a minimum, and so that the material recovered will to a minimum extent be contaminated by the flotation medium.

My invention is illustrated more or less diagrammatically in the accompanying drawings, wherein:

Figure 1 is a side elevation of my apparatus and its associated parts;

Figure 2 is a plan view of the apparatus shown in Figure 1;

Figure 3 is a vertical section through the tub along the line 3—3 of Figure 2;

Figure 4 is a section along the line 4—4 of Figure 3;

Figure 5 is a section along the line 5—5 of Figure 3.

Like parts are indicated by like characters in the specification and drawings.

In general I propose to use a bucket wheel or other suitable means which will positively convey separate batches of the material to be treated, down beneath the surface of the bath or liquid medium, and to so arrange the apparatus that after the float and sink materials have been positively conveyed to the bottom of the bath, the float material is released and allowed to rise to the surface of the bath while the sink material remains, to be positively conveyed upwardly to a different part of the bath so that the sink and float materials are separately discharged.

As these separate batches of sink and float material are positively forced and conveyed downwardly beneath the surface of the bath, I propose to gradually mix, turn over, or even agitate the materials in each batch separately so that by the time the batch has reached the bottom of the bath there will have been an initial separation between the float and the sink so that when the float is released it will be free to pass upwardly in the bath without interference from the sink material, and such float material will pass upwardly to the surface for discharge across a weir, while the sink material will be positively forced upwardly for discharge at another point.

I have disclosed my invention in connection with sufficient of the other mechanical elements which must be used with it to disclose an operative structure. 1 is the vessel or tub in which the gravity flotation separation is to take place. It comprises generally circular end walls 2 and 3 and a peripheral wall which includes a generally cylindrical portion 4 with a vertical, upwardly extending portion 5 to define a generally semi-cylindrical tub or container supported on suitable beams 6 and 7. The vertical wall 5 is on the receiving side of the tub and carries at its upper end the feed chute 8 which receives material from the screen 9 supplied to the receiving chute 8 in any suitable manner. The screen 9 is contained within a housing 10 which forms no part of my invention. Suffice it to say that the material to be treated travels or is propelled along the screen 9 in the housing 10 until it discharges over the chute 8 into the tub.

The discharge side of the cylindrical wall 4 extends upwardly to a discharge lip 11, approximately at the center line of the tank or tub, and material traveling over that lip passes down the chute 12 for treatment as will hereinafter appear.

Mounted for rotation within the tub is a wheel which comprises a plurality of vertically disposed annular rings 13. Extending perpendicular to these rings 13 and joining them are a plurality of flights 14. These flights are reinforced by flanges as indicated, though under certain circumstances the flanges might be dispensed with, or the flights, if desired, might be otherwise reinforced. These annular plates carry, extending from the tracks 15 to the outer peripheries of the plates, a plurality of reinforcing angles forming buckets or flights 16 which tend to clear the space between the end walls of the housing and the wheel of sludge and fine materials which might otherwise be deposited there. These angles also furnish an adequate reinforcement for the plates and the track. The wheel is supported on the flange rollers 18 on axles 19, supported in bearings 20. Gears 21 on these axles are in mesh with a pinion 22, so the wheel is supported at four points, and a rotation of the pinion 22, imparted by any suitable means not here shown as they form no part of my present invention, will impart a positive rotation to the wheel.

Located within the tub, inside the inner periphery of the rings, is a plate 23. This plate is cylindrical in contour, and there is working clearance between it and the inner periphery of the rings and the flights 14 just as there is working clearance between the outer periphery of the rings and the flights 14 and the semi-cylindrical wall 4. Extending upwardly from the lower extremity of this plate 23, well below the bottom of the tank, is an inclined, upwardly extending plate 24 which terminates in the housing plate 25, which in turn terminates at a point above the lower extremity of the plate 23 on the discharge side. Thus there is provided between the plate 23 and the wall 4 a channel within which the wheel may rotate and along which the flights may travel, as indicated by the arrows in Figure 3, in a counterclockwise direction.

The wall 2 is apertured as indicated at 26. The bottom of that aperture at 27 defines the discharge weir for the low specific gravity or float material. The weir discharges over a lip 28 into a chute 29.

The bottom of the tub is apertured as indicated at 30, the aperture being closed by a perforated diffuser plate 31. 32 is a distributor box adapted to receive heavy media through the pipe 33 controlled by the manually operated valve 34. Heavy media forced into the box 32 and out through the apertures in the diffuser plate 31 provides for an updraft through the tub toward the discharge weir 27.

Extending across the side of the tub and below the surface of the bath and in opposition to the weir 27 is a diffuser plate 35 associated with a distributor box 36 which receives heavy media through the pipe 37 controlled by the handactuated valve 38. The discharge chute 29 discharges the material which passes over the weir 27 to a fixed dewatering screen 39. The chute 12 discharges the heavy material brought up by the wheel adjacent the discharge of the fixed dewatering screen 39. Both the chute 12 and the screen 39 discharge to a vibrating screen 40. The dewatering screen 39 and the upper portion of the vibrating screen 40 are both located above the sump 41 so they receive the heavy media drained off through the fixed screen 39 from the float material, and the heavy media drained through the screen 40 from both the float and sink material, and it will be noted that the single vibrating screen 40 is divided by the vertical wall 42 into a passage for the sink material in line with the chute 12 and the float material in line with the discharge from the dewatering screen 39.

The lower end of the screen 40, beyond the sump 41, is provided with a collector pan 43. The spray pipe 44 sprays wash water onto the sink and the float material as it passes down the screen 40 to wash off the remaining heavy media and discharge it into the pan 43. This heavy medium is of course diluted as distinguished from the undiluted heavy medium which finds its way to the sump 41.

I have not illustrated the treatment of the refuse, of the material recovered or of the media, because what happens to them after they have passed through my tub is conventional and well known and takes place in connection with my device just as it does in well-known devices of the prior art.

Suffice it to say that the heavy media in the sump 41 are circulated through the pipe 50 from the pump 51 which receives fluid from the sump 41 through the pipe 52. Some of the discharge from the pump 50 may go through the pipe 37 to furnish a cross current at the surface of the tub to urge the float material toward the weir for discharge over the weir 27. Other of the liquid discharged through the pipe 33 furnishes the upward flow through the tub. The liquid entering the tub at the bottom and at the side flows off over the weir 27. The amount of fluid flow and the relative proportions of fluid flow imparting the updraft and the cross flow can easily be set by the handwheel-operated valves 38 and 34. A large proportion of the heavy medium, as it flows over the weir 27 with the float material, and as it passes over the lip 11 with the sink material, is recovered on the screens as indicated, returned to the sump 41, and is recirculated. What heavy medium is lost can be made up by any of the well-known methods common to the industry, and may take any suitable form, depending on the circumstances of the case.

It will be understood that tubs such as mine are used with heavy media of different character, depending on the separation which is desired, and the media used may be plain water, heavy liquids or water or other liquids carrying in suspension sand or other nonmagnetic solids, or magnetite, flue dust or other magnetic solids.

The use and operation of my invention are as follows:

The material to be cleaned or beneficiated or washed, as the case may be, is fed into the tub 1 over the chute 8 at such rate of speed that as the wheel rotates, successive batches of material are caught by each flight 14 between the flight and the liner plate 23. As the wheel carries such successive batches downwardly below the liquid level at approximately the center line of the tank, the inclination of the flight tends to vary as indicated; and as the heavy material travels downwardly, being supported by the flight, and as the inclination of the flight to the horizontal varies, the material in the batch is kneaded or stirred or turned over, and the light material and the heavy material are thus free to separate so that as the flight descends, the light material, tending to rise in the heavy medium, rises above the heavy material supported by the flight and is forced downwardly by the following flight just as indicated in the drawing.

The light material is shown unshaded and the heavy material is shown as shaded to differentiate in the drawing. At first, then, we find in each compartment between a pair of flights the heavy material on the downwardly inclined leading flight, the heavy material tending to travel inwardly along the incline to contact the plate 23, the light material tending to travel upwardly along the following flight to contact the outer wall 4, and thus the heavy and the light materials are conveyed toward the bottom of the tank, the components of each batch being initially separated.

As the wheel continues its rotation, the flight, instead of being outwardly and upwardly inclined, becomes inwardly and upwardly inclined with respect to the tub itself, and so the light, floating material tends to travel inwardly and upwardly away from the bottom of the tub, as it has been released by the movement of the flight beyond the inclined wall 24, under which circumstances there is a series of streams of float material passing upwardly away from each flight toward the weir. The escape of the float material releases any entrapped sink material and permits it to join the mass of sink material at the bottom of the tub. Meanwhile the heavy material has slid back along the now upwardly inclined surface of the leading flight and rests upon the outer wall. As this material passes over the diffusion plate 31 into the upward-flowing stream of liquid, the heavy material is not disturbed; it just travels over the diffuser plate, but the light material is encouraged in its upward-floating movement, and so before the flight returns to the surface of the liquid on the discharge side, all the light material will have left it and there will merely be a mass of heavy material propelled upwardly along the wall 4 on the discharge side by the movement of the wheel. By the time the flight has risen so that its outer edge is at the level of the discharge lip 11, all the heavy material on the flight will, by gravity, have slipped off the flight across the lip into the chute 12.

It may be desirable to have the lip 11 slightly above the static normal level of the liquid to compensate for any slight pumping action of the individual flights as they approach the lip, though this pumping action will probably be rather limited because the flights may be perforated, and there is in any event a sufficient clearance between the flights and the wall 4 so that little, if any, of the heavy media will be pumped upwardly beyond the normal liquid level.

With regard to the float material which rises throughout the tub toward the level of the weir 27, that material rises freely through and with the heavy medium uninterfered with by any accumulation of sink material until it reaches the surface. There it travels across the surface toward the weir, being aided therein by a flow of liquid set up by the entrance of heavy media through the side diffuser plate 35 on the side of the tub opposite to the weir 27.

Under some circumstances, my tub might operate without any updraft whatever, with the valve 34 completely shut. Under other circumstances it may operate without any flow across the tub, with the valve 38 completely shut. Preferably the flow through the bottom of the tub and through the side of the tub will be manually adjusted in consonance with all the conditions of operation, the one essential thing being that the amount of flow into the tub, whether it comes from the bottom or from the side, or from both together, must be such as to maintain across the weir the necessary level of liquid to dispose of all the float material which rises in the tub. To permit free discharge of the float material, the depth across the weir must usually be somewhat greater than one half of the diameter of the maximum size of particle passing through the system.

Thereafter both the heavy and the light material pass out to the vibrating dewatering screen, the light material passing first over the fixed dewatering screen, so that the major proportion of the heavy media which came out of the tub with the sink and float material will be returned without dilution through the fixed and movable dewatering screens to the sump from which the material is returned by a pump through the pipes 33 and 37 for recirculation through the tub.

That additional part of the heavy media which adhered to the light and the heavy material and was washed off in the sump 43 will be thickened or concentrated. The additional water is thus removed, and the thickened heavy media is returned to the sump for recirculation.

It will be noted that the sump is of such capacity as to be able to hold the entire volumetric capacity of the system. When the system is at rest, the sump holds all the liquid. When operation starts, the pump forces the liquid from the sump to the tub through both diffusers, fills the tub, and the circulation commences. The necessity for having the sump hold the entire capacity of the system is that if the power failed, the contents of the tub must have some place to go so as to avoid wasting the heavy media. The sump also provides storage for the medium during idle periods.

The usual air lift or other well-known stirring means is of course associated with the sump to keep heavy media in suspension during such time as the liquid is not circulating through the tub.

I claim:

1. The method of cleaning coal and the like, which consists in successively confining and immersing a generally continuous succession of separate, loosely assembled batches of solids in a bath, the specific gravity of which is greater than that of some and less than that of other of the solids, moving and imparting relative lateral movement to the solids within each confined batch while so immersed by revolving the batches downwardly in an arcuate path about a substantially horizontal axis to permit the lighter solids to rise to the top and the heavier solids to sink to the bottom of each batch successively in sink and float separation, while maintaining the solids of each confined batch against escape from the batch, thereafter releasing the solids of each separate batch at a point below the surface of the bath to permit free upward floating of the lighter solids to the surface of the bath, and separately removing the floating lighter solids and the remaining heavier solids from the bath.

2. The method of cleaning coal and the like, which consists in successively immersing a generally continuous succession of loosely assembled batches of solids in a bath, the specific gravity of which is greater than that of some and less than that of other of the solids, moving each separate batch downwardly beneath the surface of the bath, while preventing the escape of any of the solids from the batch, imparting relative lateral movement to the solids within the batch to permit the lighter solids to rise to the top and the heavier solids to sink to the bottom of the batch, thereafter releasing each separate batch to permit free upward floating of the lighter materials to the surface of the bath, laterally displacing the heavier solids in each batch and distributing them in a relatively thin layer at the bottom of the bath, to permit the escape of any entrapped lighter particles, bringing the heavy solids to rest, and then collecting the heavier solids by further lateral movement and conveying them separately upwardly to a point above the level of the bath, and separately removing the floating lighter solids and the remaining heavier solids from the bath.

3. The method of cleaning coal and the like, which consists in successively immersing a generally continuous succession of loosely assembled batches of solids in a bath, the specific gravity of which is greater than that of some and less than that of other of the solids, moving each separate batch downwardly beneath the surface of the bath, while preventing the escape of any of the solids from the batch, imparting relative lateral movement to the solids within the batch to permit the lighter solids to rise to the top and the heavier solids to sink to the bottom of the batch, thereafter releasing each separate batch to permit free upward floating of the lighter materials to the surface of the bath, distributing the heavier solids in each batch in a laterally-extended relatively thin layer at the bottom of the bath, to permit the escape of any entrapped lighter particles, subjecting the heavier solids while they are at the bottom of the bath to an upward current of liquid whose velocity is insufficient to accomplish any upward current classification but is sufficient to assist any entrapped lighter particles to escape from the layer of heavy particles, then collecting the heavier solids and conveying them upwardly to a point above the level of the bath, and separately removing the floating lighter solids from the bath.

4. The method of cleaning coal and the like, which consists in successively immersing a generally continuous succession of loosely assembled batches of solids in a bath, the specific gravity of which is greater than that of some and less than that of other of the solids, moving each separate batch downwardly beneath the surface of the bath, while preventing the escape of any of the solids from the batch, imparting relative movement to the solids within the batch to permit the lighter solids to rise to the top and the heavier solids to sink to the bottom of the batch, thereafter releasing each separate batch to permit free upward floating of the lighter materials to the surface of the batch, discharging the lighter solids which have floated upwardly to the top of the bath laterally from the bath together with bath liquid, adding liquid to the bath for upward flow through the material being separated at a velocity insufficient to accomplish any upward current classification of the material in the bath, and supplying liquid to the bath adjacent the surface thereof for cross flow toward the area of lateral discharge of the lighter solids, the total amount of added liquid being equal to the amount of liquid discharged with the lighter solids, and separately removing the remaining heavier solids from the bath.

NELSON L. DAVIS.

REFERENCES CITED

The following references are of record in the file of this patent:

UNITED STATES PATENTS

| Number | Name | Date |
|---|---|---|
| 283,540 | Vanderhoof | Aug. 21, 1883 |
| 1,887,239 | Hansen | Nov. 8, 1932 |
| 1,988,379 | Chance | Jan. 15, 1935 |
| 2,106,154 | Munro | Jan. 25, 1938 |

FOREIGN PATENTS

| Number | Country | Date |
|---|---|---|
| 463,732 | France | Dec. 24, 1913 |